Jan. 6, 1942.    J. P. FABER    2,269,014
BATCH METER
Filed Sept. 20, 1939    2 Sheets-Sheet 1

INVENTOR.
John P. Faber,
BY
S. J. Cox
ATTORNEY.

Jan. 6, 1942.                J. P. FABER                2,269,014
                             BATCH METER
                        Filed Sept. 20, 1939           2 Sheets-Sheet 2
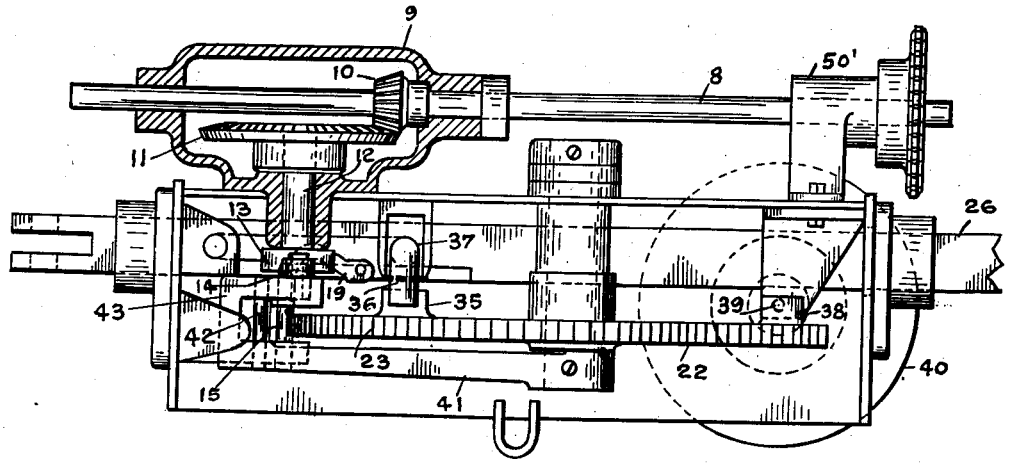
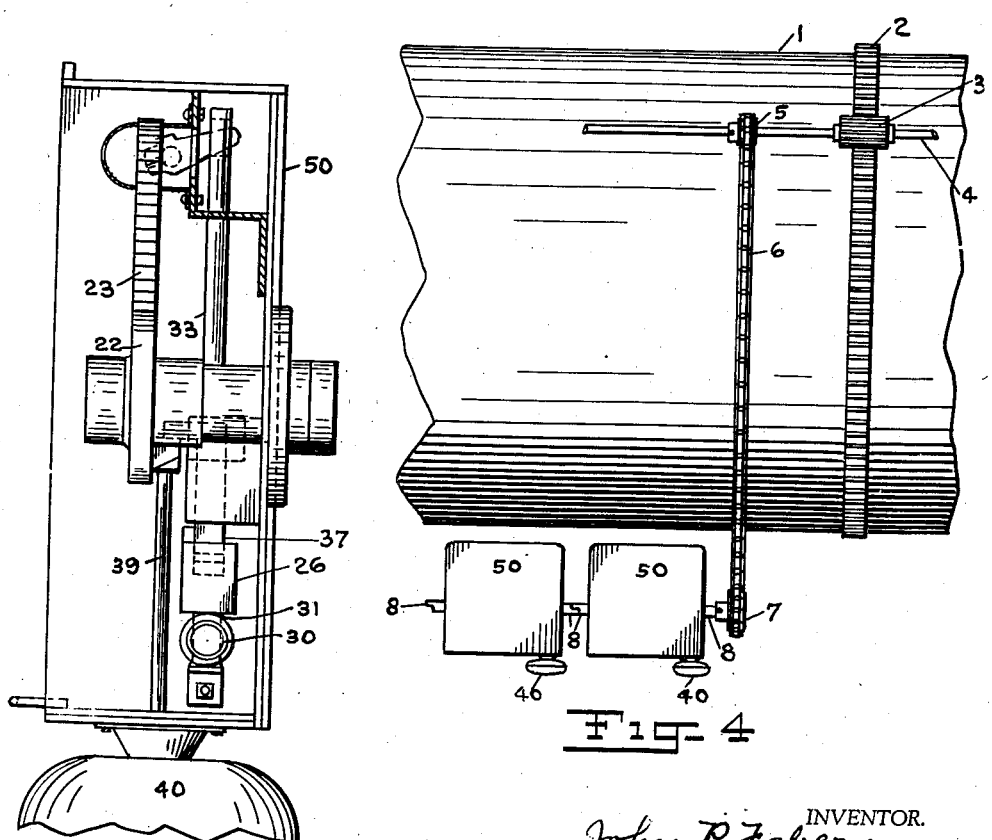
INVENTOR.
John P. Faber,
BY
ATTORNEY.

Patented Jan. 6, 1942

2,269,014

UNITED STATES PATENT OFFICE 2,269,014

BATCH METER

John P. Faber, Dunellen, N. J., assignor to Ransome Concrete Machinery Company, Plainfield, N. J., a corporation of New Jersey Application September 20, 1939, Serial No. 295,768

3 Claims. (Cl. 74—1)

The improvements relate primarily to what are known as batch meters, for measuring the time of mixing a batch or charge of materials in a retort and at the end of that period releasing the discharge means. They relate primarily to meters of this general character adapted to be used in connection with rotary drums for mixing batches of concrete aggregates provided with means for charging the unmixed aggregates— usually stone, sand, cement and water—into the drum, means for intimately mingling the same by agitating, raising and cascading them within the drum and means for discharging the mixture, the discharging means being locked in inoperative position during the mixing period and released at the end of such period.

Batch meters of this kind have been commonly used for many years, and are shown and described in numerous expired patents. They are of two general kinds: "timers" and "rotation counters," the first having a clock mechanism— commonly a "balance wheel" or its equivalent, an escapement device and gears—and the second having pawl and ratchet mechanism or the like operated step by step by a connection with the rotating drum which actuates a pawl at the end of each rotation or fraction thereof. In meters of the first class the drum rotates at a given speed, which is frequently 18 to 20 R. P. M., and the timer is energized or wound by connection with the skip or other loading device when the said loading device discharges the batch into the drum, and measures the period of time required for the drum to perform a given number of rotations, releasing the discharge mechanism at the expiration of that time; and the rotation counters simply count the number of rotations and release the discharge mechanism when the predetermined rotations have been recorded.

Both types of meters are subject to variations due to the interference of dirt or other foreign matter with the mechanism, including the almost impalpable cement dust, which is very penetrative and is set or hardened by atmospheric moisture, and the shocks and vibrations communicated to the mechanism by the operation of the mixing, charging, discharging and distributing apparatus and their power unit. This will be understood when it is stated that the batches of aggregates, which may be a cubic yard or more, weighing upwards of 2 tons per cubic yard, are usually elevated by the charging device, dumped into the drum, thrown about therein, then dumped on a discharge chute, into a distributing bucket, and then, in paving apparatus and the like, conveyed in the bucket along a heavy, swinging steel boom extending from the mixer frame, before being deposited at the point of application. In pavers of the two-compartment drum type two batches of a cubic yard or more are mixed simultaneously in the drum and each batch is charged, transferred and discharged, the charging and discharging operations taking place simultaneously to a certain extent and the drum rotating and tossing the aggregates about continuously.

The shocks and agitation are more serious in their effect on the timers, but have some effect on the rotation counters, and the latter are subject to additional inerference due to the rapid rotation of the drum which causes the usual projection on its periphery to strike the device which operates the pawl mechanism to move the counting ratchet device with considerable force, sometimes causing over movement of the parts and even injury thereto if they are obstructed in any way. It will be seen that in a drum 4 feet in diameter, which has a peripheral circumference of about 12 feet, rotating at 20 R. P. M. the operating projection on the outer shell of the drum will have a speed of about 4 feet per second, and that this projection will strike a stationary pawl operating device with considerable force.

The rotation counters are theoretically more accurate, because the timers require accurate timing of the drum revolutions under varying load and accurate chronological operation of the "clock" mechanism. In practice, however, the timers have generally been considered more satisfactory, due to the interfering factors above mentioned in connection with the rotation, and to other interfering conditions.

The present improvements relate to meters of the second class and are designed primarily to insure against improper operation, undue deterioration and injury to the parts of rotation counting meters, and also to provide strong, durable and dependable construction and precise operation of the said parts and simplify and make the same more durable.

The improvements are illustrated in the accompanying drawings, referred to herein which show an exemplary embodiment and in which—

Fig. 2 is a horizontal section on line 2—2 of Fig. 1 showing other parts in plan, the main casing being omitted;

Fig. 3 is an end view of the batchmeter mechanism with the end of its casing removed;

Fig. 4 is a side elevation showing a mixing drum and batchmeters operatively connected therewith.

Figure 1:
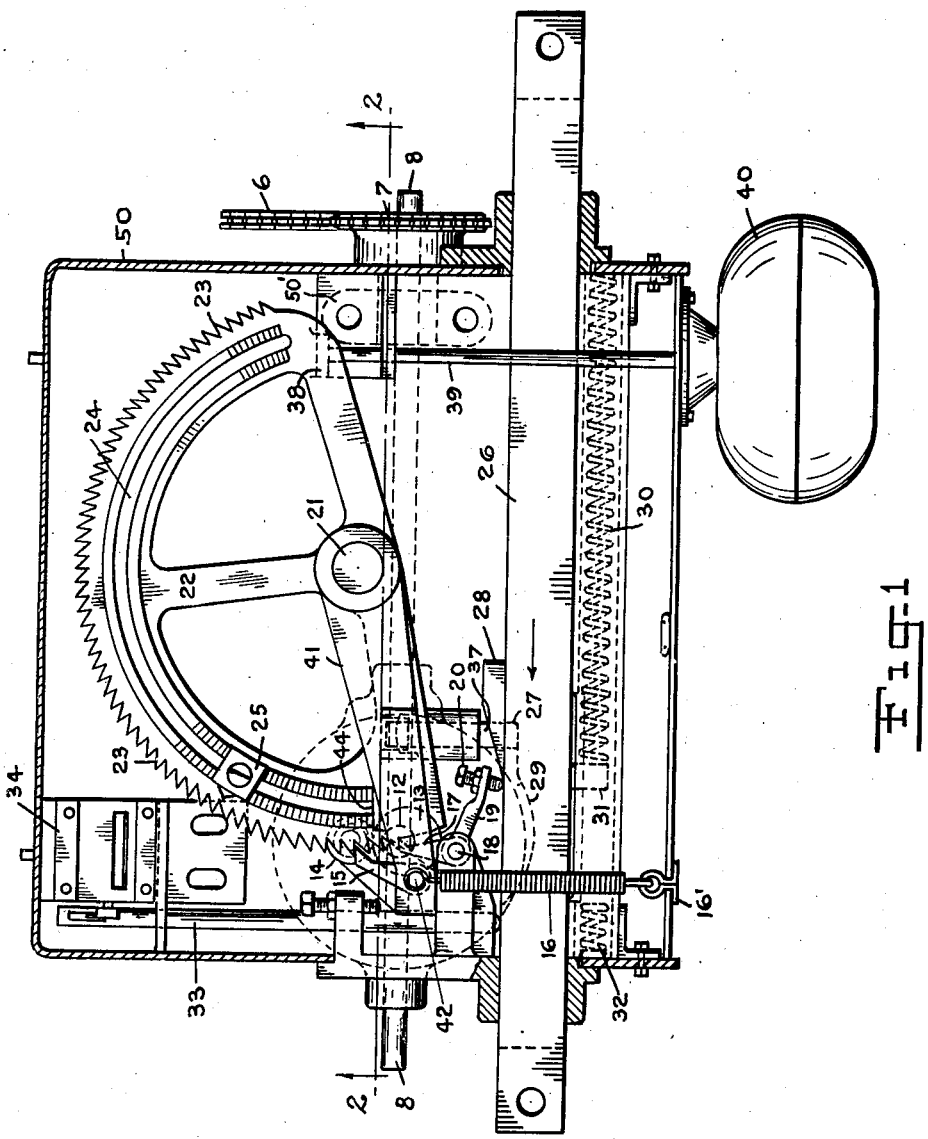
Fig. 1 is a side elevation of the batchmeter mechanism with its casing in vertical section.

In the views, 1 indicates a mixing drum, 2 a toothed gear running around the mixing drum and secured to rotate therewith which serves the purpose of permitting the driving of the drum and also turning the gear 3 mounted on the shaft 4 suitably mounted which shaft has fixed on it a sprocket drive 5 over which runs the chain drive 6 connecting with the sprocket wheel 7 mounted on the sectional batch meter drive shaft 8.

The batch meter drive shaft 8 runs through the batch meter housing 50 and is mounted in bearings 50' thereon passing through the gear housing 9 which contains reduction gears 10 and 11. The reduction gear 11 drives the shaft 12 rotating the eccentric 13 which is fixed to said shaft. The eccentric 13 is in contact with the roller 14 which roller is mounted on an arm of the ratchet-engaging pawl 15. The pawl 15 has attached to it a tension spring 16 to aid in its retraction, after the rotation of the eccentric 13 has been accomplished, said spring 16 being attached to the batch meter by the eye bolt 16'. The pawl 15 has mouted below it a detention dog 17 mounted on the shaft 18 which shaft has affixed to it, an arm 19 at the end of which is an adjusting screw-bolt 20. Within the batch meter casing there is the shaft 21 upon which is loosely mounted the segment 22 having ratchet teeth 23 along its outer edge and a channel 24 having an adjustable stop member 25 mounted in it and adapted to contact the fixed stop 44. The pawl carrying arm 41 is also mounted loosely on the shaft or pivot bar 21 and carries the pawl 15 pivoted on a pin 42 at the outer end of said arm, which is formed into an angular crook 43 also mounting the roller 14.

Below the timing segment 22 is a latch bar 26 having a locking shoulder 27, dog release 28 and a curved counter-operating-recess 29. The compression spring 30 acts upon the stop 31 of bar 26 for advancing the said bar into unlocked position after proper time interval, and stop 31 having a shock absorbing spring 32 to prevent it from striking the casing 50 of the batch meter. When the latch bar 26 is forced forward into unlatched position the recess 29 is adapted to receive the end of the rod 33 connected to a suitable batch counting device 34 so that upon the lowering of the rod 33 into said recess a batch of material is thereby recorded. Mounted on the segment 22 is the projection 35 which comes in contact with the arm 36 of the latch bar release rod 37. The segment 22 also contains a bell ringing projection 38 which engages the rod 39 at the proper time, which rod through suitable connections rings the bell 40, thus indicating that a batch has been properly mixed.

In operation the mechanism works as follows: Upon the raising of the skip for loading the mixer (not shown) the latch bar 26 is forced forward thus placing and locking the spring 30 under compression by means of the projection 31 being forced against said spring. Upon the bar 26 being forced forward the lock rod 37 falls into the depression in front of the shoulder 27 which forms therewith a locking notch thus preventing latch bar 26 from returning to its unlatched position upon the lowering of the skip. Simultaneously with the moving of the bar to locked position by the action of the skip the adjustable bolt 20 on the rod 19 rides down the inclined release 28 thus returning the dog 17 and permitting the pawl 15 to return to contact with the teeth 23 of the segment 22. The revolving of the drum 1 carrying with it the annular rack 2 turns the gear 3 and the sprockets 5 and 7 and thus drives the shaft 8 of the batch meter. Through the use of the reduction gears 10 and 11 the speed of the shaft 8 is reduced so that the shaft 12 will turn at the same rate of rotation as the drum or if desired at some other rate in fixed relation thereto. The turning of the shaft 12 rotates the eccentric 13 so that for each complete rotation of the shaft 12 with the eccentric 13 thereon the roller 14 connected with the ratchet 15 forces the latter slowly upward and counts a definite rotative movement of the drum. Since the pawl 15 is in contact with the teeth 23 of the segment 22, each time the ratchet moves upward through the action of the eccentric 13 the segment 22 is caused to move clockwise the extent of one tooth, and it is prevented from slipping back on the lowering of the ratchet 15 by the action of the dog 17 which has now slipped into a lower notch and retains the segment in its advanced position. The pawl 15 is aided in returning to a notch lower down by the action of the spring 16 and the gravity of the arm 41. This spring also holds the roller 14 in contact with the eccentric 13. The segment 22 will rotate clockwise only less than 180 degrees, according to the position of the sliding stop 25, whereupon the projection 35 strikes the arm 36 affixed to the bar 37, thus pulling the bar 37 out of the locking device 27 of the latch bar 26 and allowing the spring 30 to return the latch bar to its unlocked position. Simultaneously with the lifting of the bar 37 the projection 38 strikes the bell rod 39 thus setting in motion the mechanism for the ringing of the warning bell 40. The ratchet 15 and dog 17 are swung out of contact with the teeth 23 of the segment 22 by means of the bolt 20 riding up on the dog release 28 and the dog striking the pawl and the segment 22 is thereby allowed to rotate back in a counterclockwise direction by gravity thus positioning it for another counting operation. Upon the movement of the latch bar 26 to unlocked position the batch counting bar 33 slips into the recess 29 thus actuating the counter 34 so that the mixing of a batch is recorded thereon.

The number of revolutions which must be made by the drum 1 in order to complete the mixing of a batch of concrete may be varied by the adjustment of the adjustable stop member 25 to any position on the segment in the slot 24 and securing it in any required position.

It may be noted by looking at Fig. 4 that when a double drum mixer is used two batch meters of the same construction and operation may be set up both being driven by the shaft 8. However, for the purpose of describing this invention a single bath meter only is shown. Where two batch meters are used it is only necessary to synchronize them by means of a member 25 located in each.

It will be seen from the foregoing description that the meter is in preferably constant operative connection with the drum and free from the shocks and strains of intermittent contacts, although it is so designed that it can be used to advantage with means for intermittent actuation;

that it is driven at a slow and unvarying speed, its gear and other parts being of course in such ratio and relation as to record a rotation of the drum for each actual rotation; that the parts are all positive and certain in their action and act by gravity, although springs may be employed to accelerate their action, except for the skip actuated and spring retracted setting bar; and that the mechanism is extremely simple and so constructed and arranged that it will not be interfered with by the shocks and vibrations incident to its operation or due to the mechanisms in connection with which it is used.

In the embodiment shown the arm 41 which swings freely on its pivot 21 retracts the pawl 15 after each upward step swinging downwardly by gravity, and also presses the roller 14 against the eccentric 13 and is accelerated in this action by the spring 16 which also being connected with the pawl below its pivot tends to keep the said pawl in engagement with the teeth 23. The operation is however essentially a gravity operation and by giving the proper weight to the parts can be carried on without the employment of the spring. Nevertheless, the spring in its peculiar relation and arrangement is an important item. Various changes in the construction and arrangement of the embodiment shown may be made without departing from the invention. The invention further is only limited to gravity action to the extent expressed in the following claims.

What I claim is:

1. In a device of the character described a counting member constructed and arranged to return by gravity to initial position after counting movements, a counter operating device, gravity acting means for moving it while in engagement with said counter, means for releasing said counter for movement independent of said operating means, said gravity actuated means causing it to remain in engagement therewith until a given number of revolutions of the drum have been counted, a detent mounted to cooperate with said counter operating device and said means for releasing the counter acting through said detent.

2. In a device of the character described, a ratchet constructed and arranged to move by gravity to and remain in normal position when released, a swinging arm mounted to have operative relation therewith also constructed and arranged to move by gravity to and remain in normal position when released, a pawl connected with said arm and arranged to be operated therewith to move said ratchet step by step as said arm is moved against its gravity, an eccentric connected with said pawl and said arm, means for moving said eccentric to operate the said two parts against their gravity in one direction, the connection between said eccentric and the pawl and arm comprising a roller held in constant engagement with the former by the weight of the latter.

3. In a device of the character described, a ratchet constructed and arranged to move by gravity to and remain in normal position when released, a swinging arm mounted to have operative relation therewith also constructed and arranged to move by gravity to and remain in normal position when released, a pawl connected with said arm and arranged to be operated therewith to move said ratchet step by step as said arm is moved against its gravity, an eccentric connected with said pawl and said arm, means for moving said eccentric to operate the said two parts against their gravity in one direction, the connection between said eccentric and the pawl and arm comprising a roller held in constant engagement with the former by the weight of the latter and a detent normally engaging said ratchet and movable out of engagement therewith and simultaneously into engagement with said pawl to release said ratchet from said pawl.

JOHN P. FABER.